_United States Patent_ [19]

Blandy

[11] Patent Number: 4,631,674

[45] Date of Patent: Dec. 23, 1986

[54] ACTIVE WAIT

[75] Inventor: Geoffrey O. Blandy, New Paltz, N.Y.

[73] Assignee: International Business Machines Corporation, Armonk, N.Y.

[21] Appl. No.: 698,304

[22] Filed: Feb. 5, 1985

[51] Int. Cl.$^4$ .............................................. G06F 9/46
[52] U.S. Cl. .................................................. 364/300
[58] Field of Search ....................................... 364/300

[56] References Cited

U.S. PATENT DOCUMENTS 4,475,156 10/1984 Federico et al. .................... 364/300

_Primary Examiner_—Raulfe B. Zache
_Attorney, Agent, or Firm_—J. Dennis Moore

[57] ABSTRACT

In a multi-processor system, a program for reducing processor overhead in the dispatch of available work by shifting the burden of responsibility for checking other processors for readiness to accept the work from the Active processor to the otherwise Idle processor. When a processor runs out of work, instead of loading a Wait State PSW it scans queues of available work. During this scan, the scanning processor runs enabled for interrupt so that it can be responsive to I/O and External Interrupts which typically signal incoming work.

In the practice of the invention, each processor must have its own storage locations which serve as indicators of available work. In the preferred embodiment they reside in isolated cache-lines that are referenced solely by the owning processor except that another processor may update the indicator when it has prepared a unit of work which may (or must) be performed by the owning processor.

On machines with store-in caches, interference of Active processors by Idle processors is minimized by having the inventive program result in cross-interrogations only when an Active processor has readied work for an Idle processor or its about to go Idle itself.

Instructions which require any sort of hardware serializaation among processors which could impair the performance of active processors are avoided whenever feasible.

3 Claims, 2 Drawing Figures

ACTIVE WAIT

BACKGROUND OF THE INVENTION

1. Field of the Invention

The present invention relates generally to multiprocessors and more particularly to programs for allocating tasks among a plurality of processors connected together in a tightly-coupled multiprocessor configuration. It relates specifically to situations where the unit of work, or task, may be executed on only one processor at a time.

2. Background

Tightly coupled multiprocessing systems comprise two or more connected processors which share central storage, are capable of executing simultaneous instruction streams and which run under the control of a single operating system. An example of such a multiprocessor system is the IBM (IBM is a Registered Trademark) 3081K running under the control of the IBM Virtual Machine System Product High Performance Option (hereinafter "VM/SP HPO").

In such systems, typically there will be units of work, or tasks, (some or all of which can be executed by only one processor at a time) which enter the system or are generated by the system and which must at some time be dispatched by an available processor. Such systems typically use some data structure, such as a control block, to represent these tasks. This allows the system to maintain status for the task, and to place it on queues to await dispatch or to defer the execution of the task. Tasks represented in this manner will be called dispatchable tasks in this application.

Certain conditions may exist in a multiprocessor system such that a dispatchable task may not be run while these conditions persist. For example, a task may require that a supervisory function be performed on its behalf before it can run or continue to run. Until that function completes, the task is "not ready". Completion of the function "readies" the task, and the "readying" processor typically indicates this in the data structure representing the task.

In such systems, a processor is considered "active" when it is performing a task or when it is in the process of selecting a task to perform. A processor is considered "idle" when it has verified that there is no task available for it to perform.

Any single processor is Idle upon detecting that:
1. there are no readied dispatchable tasks available to the system or
2. all readied dispatchable tasks are being processed by other processors or
3. all readied dispatchable tasks are ineligible to be run on that processor In case 1, all processors in the system are Idle. In case 2 and 3, there is at least one Active processor.

The execution of a task may cause another task to become available to the system. Therefore an Active processor may generate or ready a task such that there is a task in the system which can or must be performed by an Idle processor and which cannot be handled by the current set of Active processors. In order to maximize the utilization of all processors, there must be a means to allow an Idle processor to dispatch that task.

In prior art systems, where an Idle processor is typically placed in a wait state, this is accomplished by making an Active processor responsible for detecting the existence of an Idle processor and signalling the Idle processor that the work is available. The Idle processor then receives an interrupt, exits wait state and searches the queues of dispatchable tasks to find the readied task.

This processor checking and signalling by an Active processor and fielding the resulting interrupt by an Idle one delays the dispatching of the readied task and burdens the Active processor with work that represents undesired overhead. The delay is amplified on cache machines when techniques of status-checking and/or interrupt handling involve the examination of storage locations that were last modified by another processor. The degree of amplification depends upon the nature of the cache and the extent to which storage is modified in examination. For example, in a store-in cache machine such as the IBM 3081K the cache lines containing the "message" fields have to be discarded from the cache of the modifying processor and brought into the cache of the examining processor.

Prior art systems also face a timing problem in determining the status of potentially Idle processors. Prior to going into a wait state, a processor must scan the queues of potential work to determine that there are no available tasks and set a flag to indicate that it is in the wait state. After an Active processor readies a task that can be performed by an Idle processor, it checks the status flags of the potentially Idle processors. If the flag is checked after the "idle" processor has checked the work queues but prior to the setting of the Idle flag, the Active processor will be unable to detect that the Idle CPU is about to enter wait state. This problem has traditionally been solved by over-signalling although it could also be solved by serializing the entire scanning-flagging path. Both methods negatively impact system performance.

Accordingly, there is a need for a multiple processor system in which the dispatch of readied work is performed without excessive "overhead", that is, without utilizing excessive processor time that could otherwise be used for executing tasks.

SUMMARY OF THE INVENTION

It is therefore an object of the present invention to expedite the dispatching of "readied" and internally generated dispatchable tasks in tightly-coupled multiprocessor systems. To achieve this object, the present invention implements the following steps. At the point in time that a processor determines that it is Idle, it is enabled for interrupt if not already so enabled, and a routine is run designed to detect whether a dispatchable task eligible to be run on the Idle processor has been readied since the Idle processor last scanned the dispatch queues. The detecting routine may be the same as that used by Active processors or may be a more specialized version of that routine. If such a task is found, the processor is disabled for interrupt and executes a routine which selects and dispatches the recently "readied" task. If such a task is not found, the Idle processor waits for a predetermined delay period selected to reduce interference between the Idle processor and other processors in the system, and then loops to the start of the detecting routine.

In this way the responsibility for assuring that Idle processors have an opportunity to detect and dispatch readied work is not borne by an Active processor as in prior art systems. Instead, this task is given to the processor which is ready for work and otherwise inactive. In other words, the Idle processor is made to look after itself, thus freeing valuable processor time for the Active processor.

Because the Idle processor does not enter the wait state, care must be taken to ensure that it does not interfere with any Active processor. Such interference could result if the Idle processor is allowed to contend for a limited resource required by an Active processor. In store-in-cache machines, the most salient resources of this type are cache-lines that are modified by at least one processor. The Idle processor should also be programmed so as not to execute instructions which require serialization among multiple processors. Instructions such as the IBM 370 instruction Compare and Swap may be used to serialize access among processors to a specific fullword in storage. Such instructions are used to modify storage flags (locks) which are in turn used to control the serialization of access to resources which must not be used concurrently by multiple processors. The locks are set to one value to indicate that the resource is not currently in use and another value(s) to indicate that a processor has exclusive use of the resource. ACTIVE WAIT may be required to use such serialized resources and therefore must go through the locking protocol. However, prior to issuing a hardware serialized instruction (e.g. Compare and Swap), it may determine if accessing the resource will prove to be fruitful (i.e. there is an available task on a queue - where the queue is the serialized resource) and whether the lock is currently available. This "interrogation" of the lock may be performed with a nonserialized instruction (Compare).

Additionally, in any cache machine, the idle processor should minimize all references to storage that are not likely to be referenced during its active state.

In that caches have limited capacities, these references will cause potentially useful cache lines (cache lines which may be rereferenced in the active state) to be discarded from the cache.

The present invention employs techniques which all but eliminate the interference generated by the ACTIVE WAIT processor and which minimize the amount of storage referenced solely by the ACTIVE WAIT function.

The foregoing and other objects, features and advantages of the invention will be apparent from the more particular description of the preferred embodiments of the invention, as illustrated in the accompanying drawing.

DESCRIPTION OF PREFERRED EMBODIMENT OF THE INVENTION

Figure 1:
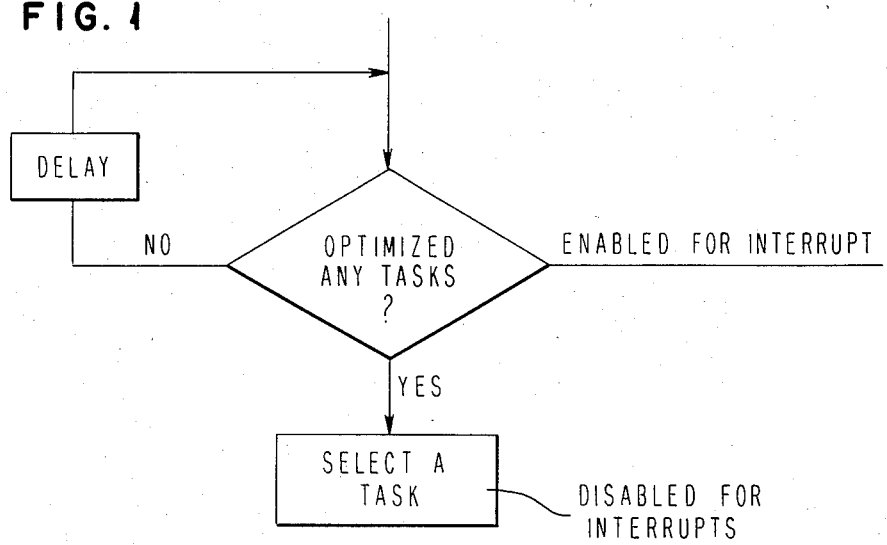
FIG. 1 is a flow chart of one embodiment of the invention.

The preferred embodiment is implemented in connection with the aforementioned IBM 3081K running the IBM VM operating system, and is hereinafter referred to as ACTIVE WAIT for purposes of brevity. As stated previously, the 3081K is a store-in cache machine. That is, storage modifications effected by the processors are made in cache and modified storage remains in the cache of the modifying processor until it is either aged out of cache or referenced by another processor. The 3081K is described in more detail in 3081 PROCESSOR COMPLEX PROCESSOR UNIT MODEL K INTRODUCTION/MAINTENANCE (PRM), IBM Form No. ST227075.

The VM/SP HPO operating system is a multi-purpose time-sharing system employing a concept known as "Virtual Machines". The operating system manages the resources of the read hardware configuration so as to present each user with a virtualized System 370 configuration. This system is described in more detail in several publications, namely: IBM VIRTUAL MACHINE/SYSTEM PRODUCT HIGH PERFORMANCE OPTION: GENERATION INFORMATION, copyright International Business Machines Corporation (hereinafter "IBM Corp.") 1983, GC19-6221-3; IBM VIRTUAL MACHINE/SYSTEM PRODUCT HIGH PERFORMANCE OPTION SYSTEM PROGRAMMERS GUIDE Rel. 3.4, copyright IBM Corp. 1984, SC19-6224-3; IBM VIRTUAL MACHINE/SYSTEM PRODUCT HIGH PERFORMANCE OPTION OPERATOR'S GUIDE, copyright IBM Corp. 1983, SC19-6225-2; VIRTUAL MACHINE/SYSTEM PRODUCT HIGH PERFORMANCE OPTION CP COMMAND REFERENCE FOR GENERAL USERS Rel. 3.4, copyright IBM Corp. 1984, SC19-6227-3; IBM VIRTUAL MACHINE/SYSTEM PRODUCT HIGH PERFORMANCE OPTION OLTSEP AND ERROR RECORDING GUIDE Rel. 3.4, copyright IBM Corp. 1984, SC19-6230-2; IBM VIRTUAL MACHINE/SYSTEM PRODUCT HIGH PERFORMANCE OPTION DATA AREAS AND CONTROL BLOCK LOGIC-CP Rel. 3.4, copyright IBM Corp. 1984, LY20-0896-3; IBM VIRTUAL MACHINE/SYSTEM PRODUCT HIGH PERFORMANCE OPTION SYSTEM LOGIC AND PROBLEM DETERMINATION GUIDE-CP Rel. 3.4, copyright IBM Corp. 1984, LY20-0897-3, each of which is incorporated herein by reference in its entirety. While numerous other publications are also available relating to VM/SP HPO, the above publications give the programmer of ordinary skill ample information to understand sufficiently the IBM VM/SP HPO to be able to apply the teachings of the preferred embodiment of the present invention presented herein so as to make and use the invention in that operating system. The principles of the present invention presented herein likewise provide ample teaching to enable a programmer of ordinary skill to extend the present invention to other operating systems as well.

According to ACTIVE WAIT a processor becomes Idle in the same manner as in the prior art, that is, the processor runs through the DISPATCHER module. The final steps of that routine involve (1) looking for tasks to perform, then (2) if tasks are found setting the environment for running of the task, in which case it does not become Idle, or (3) if no tasks are found going into a WAIT state. However, according to the present invention, the processor goes into ACTIVE WAIT, rather than the hardware WAIT state as in the prior art. The above-described routine by which a processor goes into WAIT is well known in the art.

The simplified flow chart for the preferred embodiment of the ACTIVE WAIT routine is shown in FIG. 1. From this figure it can be seen that the routine first ascertains by way of an optimized interrogation whether there are any tasks for it to perform. This is not the same interrogation as in the DISPATCHER module. Rather, it is optimized to minimize interference with the operation of other processors.

The present invention minimizes storage contention. ACTIVE WAIT, the preferred embodiment, causes storage contention by an Idle processor with an Active one only when the Active processor has readied work for the Idle one. This is accomplished by providing each processor with its own storage locations which serve as indicators of available work. That is, each processor has its own dispatching queues. These queues reside in storage locations (cache-lines) that are referenced solely by the owning processor except that another processor may update the indicator when it has prepared a unit of work which may (or must) be performed by the owning processor.

Even when referencing these "processor-local" cache-lines, it is important to limit the frequency of reference. This minimizes contention for the cache-line when an Active Processor is in the process of updating the indicator. Thus, each storage indicator should be referenced a maximum of one time during each pass of the Active Wait loop. Additionally, there must be a delay within the loop during which no storage references are made. In the preferred embodiment, ACTIVE WAIT, this is accomplished with an IBM System 370 Branch on Count instruction. The length of this delay should be sufficient to allow another processor to update the indicator without suffering from unnecessary contention.

In VM/SP HPO Rel. 3.4 the queues contain forward and backward pointers with a unique storage location (the queue anchor) which contains the address of the first and last element in the queue. Therefore, an Active processor may have to make three storage references to the queue anchor (a load and 2 stores). The following example illustrates what happens in the operation of HPO 3.4 on a 3081K during a reference to a cache-line by an Idle processor when an Active processor is in the process of updating the cache-line, without the aforementioned delay period implemented.

1. The initial reference to the queue anchor by the Active processor results in a cache-to-cache transfer of the line containing the queue anchor (55+ cycles).
2. During this period the Idle processor references the queue anchor and causes the cache-line to be returned to its cache via another cache-to-cache transfer which commences after completion of the store for the Active processor.
3. When the Active processor makes its second reference to the queue anchor, it is delayed until the instruction being executed by the Idle processor completes (55+ cycles) of the Idle processor and further delayed while the cache-line is transferred back into its cache (55+ cycles).

Steps 2 and 3 are repeated for the third reference by the Active processor. The resulting update takes more than 275 cycles to complete.

By introducing the delay period specified by the present invention, the entire cache-line reference operation is shortened to between a minimum of 55+ cycles (if the entire operation commenced and ended while the Idle processor was in its delay loop) and a maximum of 165+ cycles (if the Idle processor came out of the delay loop prior to the Active processor's final reference).

The length of the delay period must be greater than the length of time it takes the Active processor to suffer a cross-interrogate miss and complete the update process. However, excessive delay periods unnecessarily prolong the amount of time required by the Idle processor to dispatch the readied task. The following formula is used in ACTIVE WAIT to determine the average amount of total system time that is required for the Active processor to notify the Idle CPU for any given delay period for a store-in cache processor:

$$\frac{(D - (C - 1))*(D + C) + (C - 1)*(3C + D) + (D - (C - 1))*C + (C - 1)*(2C)}{D}$$

Where:
D is the length of the delay period; and
C is the time required to transfer the cache line.

Another technique which can be used to avoid interference with active processors, is for active wait to avoid obtaining locks (which requires special instructions which perform serialization) until it is determined that a task exists on a queue and the lock is available (the availability of the lock is determined using non-serialized instructions).

In HPO Rel. 3.4, each processor has its own dispatch queues. This can lead to a decrease in performance when one processor has multiple tasks represented on its queues while the other processor has none. Active Wait provides for an extremely simple load balancing scheme.

After ensuring that there is no work on its own queues, the Idle processor interrogates a counter which represents the number of shareable dispatchable tasks on the other processor. If the counter is greater than 1 the Idle processor "steals" the second task by placing the task on its dispatch list and dispatching it. The counter is maintained in an isolated cache-line so that the frequent interrogation by the Idle processor typically causes cache interference only:

when the count has increased (in which case there may well be work for the Idle processor to perform); or
when the count has gone to 9 (in which case there is probably no work for either processor).

Figure 2:
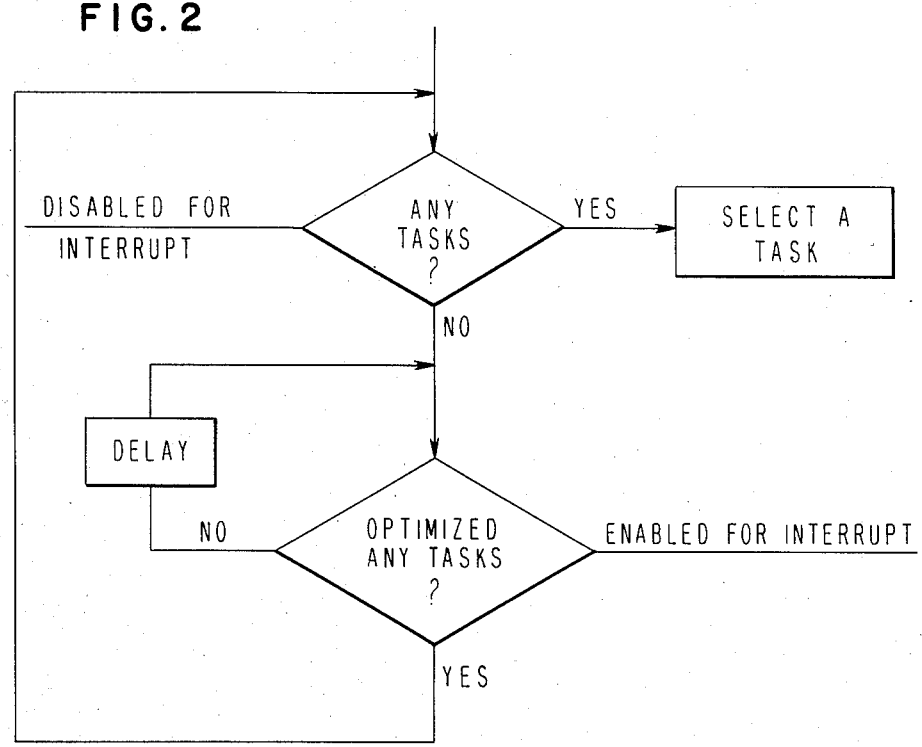
FIG. 2 is a flow chart of another embodiment of the invention.

FIG. 2 shows a flow chart for another embodiment of the present invention. In this embodiment, rather than incorporate the invention in the DISPATCH module, as was done in the previous embodiment shown in FIG. 1, the invention is implemented following a negative determination by the DISPATCH module of work to be done. Then, if a task is found, the program loops back to the dispatch module for utilization of its selection function.

The following is a list of logical steps detailing the sequence of logical functions in an embodiment of the present invention according to the type shown in FIG. 1 implemented on VM HPO. They may be used as a basis for preparing codes for embodiments of the present invention to be run on other systems as well.

(1) STARTWAIT←TIMER
Optionally save the value of timer(s) so that the system can maintain statistics on the amount of time spent in "wait".
(2) HDWRFLG←ACTIVE WAIT
Optionally set some flag which can indicate to a hardware monitor that the processor is in "wait".
(3) ENABLE
Enable for interrupts.
(4) LOOP IF LOCALQS=0 GOTO NOLOC Examine the queues associated with this processor is there are no tasks queued - continue at NOLOCAL.

(5) IF LOCAL-LOCKS NOT AVAILABLE GOTO NOLOC
Interrogate all locks which will be required to dispatch the work discovered on the queues.

(6) DISABLE
Disable for interrupts.

(7) OBTAIN LOCAL-LOCKS
Attempt to obtain all required locks.

(8) IF LOCAL-LOCKS NOT AVAILABLE GOTO RELEAS
If locks have been acquired by another processor since the interrogation - release any locks obtained.

(9) IF LOCALQS=0 GOTO RELEAS
Re-examine the queues associated with this processor if there are no tasks queued release the locks.

(10) GOTO DSPTCH
Prepare to dispatch a task.

(11) RELEAS RELEASE LOCAL-LOCKS
Release all locks obtained.

(12) ENABLE
Re-enable for interrupts.

(13) NOLOC IF WORKAVAIL-NO GOTO DELAY
Examine a flag set by other processor(s) which indicates that there is an excess of work on their local-queues.

(14) IF OTHER-LOCKS NOT AVAILABLE GOTO NOLOC
Interrogate all locks which will be required to dispatch the work which may be on the other processor's queue.

(15) DISABLE
Disable for interrupts.

(16) OBTAIN OTHER-LOCKS
Attempt to obtain all required locks.

(17) IF OTHER-LOCKS NOT AVAILABLE GOTO RELOTH
If locks have been acquired by another processor since the interrogation - release any locks obtained.

(18) DO UNTIL END-OF-QUEUE IF TASK RUNABLE GO TO DQ NEXT TASK
Examine the queues associated with other processor for runnable task.

GOTO RELOTH
If none found - release locks.

(19) DQ DEQUEUE TASK Q=OTHER
Remove task from other queue.

(20) OBTAIN LOCAL-LOCKS SPIN=YES
Unconditionally obtain locks required to place a task on a local queue.

(21) QUEUE TASK Q=LOCAL
Place task on a local queue.

(22) GOTO DSPTCH
Prepare to run task.

(23) RELOTH RELEASE OTHER-LOCKS
Release all locks obtained.

(24) ENABLE
Re-enable for interrupts.

(25) DELAY DELAY
Delay before continuing loop.

(26) GOTO LOOP
CONTINUE

(27) DSPTCH HDWKFLG←NOWAIT
Indicate processor "active".

(28) EXIT TO DISPATCHER

Exit to the dispatcher so that the discovered task can be dispatched.

In VM HPO Step 2 is accomplished by setting PSW KEY to a key not used by other software that would run in supervisor state.

The processor must be enabled for interrupts when running the main-line of the routine so that it can be responsive to work that enters the system via interrupts. However, it must disable prior to performing any non-preemptable task. (The above Pseudo Code assumes that the serialized use of the system queues is non-preemptable.)

All operand storage references made through step 13 should be to storage locations that reside in cache-lines that are referenced almost exclusively by the local processor. This means that the queue anchors and locks must not be typically referenced by any other processor and that there are not storage structures that are typically referenced by another processor that reside in the same cache-lines as these queue anchors and locks. Similarly, the flag WORKAVAIL in Step 13 should be located in an isolated cache-line which is modified only as the availability of work changes. The reason for this cache isolation is to minimize or eliminate the overhead of transferring cache-lines from one processor's cache to another's.

The order of execution of steps 4–9 and 13–17 may appear to be non-optimal. It may seem that it would be more efficient to obtain the required locks and then search the queues. However, because locking must involve some hardware serialization function and because this serialization function is likely to impair the performance of an active processor, unnecessary locking must be avoided. Therefore, code implementing the present invention should (1) be optimized to determine if a task is available and (2) ensure that the lock is available (using an instruction which is not hardware-serialized) prior to attempting to obtain the lock.

Thus, while the invention has been described with reference to preferred embodiments thereof, it will be understood by those skilled in the art that various changes in form and details may be made without departing from the scope of the invention.

What is claimed is:

1. In a tightly coupled multiprocessor system configured so as to process tasks at least some of which are required to be processed by only one processor at a time, and in which the operation of an Active processor can lead to the readying or creation of a dispatchable task, a method of causing an Idle processor to select a task readied by an Active processor, comprising the steps of:

enabling a first processor for interrupt when the first processor detects that it is Idle;

detecting, by said first processor, whether a readied, dispatchable task eligible to be run on said first processor exists in the system;

disabling said first processor for interrupt if such a dispatchable task is found by said first processor; and then selecting said task, for running on said first processor; and repeating the step of detecting after a predetermined delay selected to reduce interference between said first processor and other processors in the system, if such a dispatchable task is not found by said first processor.

2. A method according to claim 1 wherein said step of detecting is optimized to minimize the examination of storage locations that are modified by an Active processor.

3. A method according to claim 1 wherein said step of detecting is optimized to minimize the degradation of system performance in cache machines by minimizing the number of storage references to locations not typically used in a processor's active state, by avoiding storage contention with active processors through the use of data structures which are maintained in isolated and private cache-lines, by avoiding hardware serialized through the technique of queue and lock interrogation prior to the actual attempt to obtain locks, and by minimizing cache contention when a task is made available by an active processor through the use of an optimal delay period.

* * * * *